United States Patent [19]

Baas

[11] Patent Number: 4,495,896
[45] Date of Patent: Jan. 29, 1985

[54] DISC FOR THE PROTECTION OF THE UDDER OF A COW

[76] Inventor: Gerardus C. Baas, Meentweg 87A, 3755 PB Eemnes, Netherlands

[21] Appl. No.: 433,202
[22] PCT Filed: Apr. 2, 1982
[86] PCT No.: PCT/EP82/00078
  § 371 Date: Sep. 30, 1982
  § 102(e) Date: Sep. 30, 1982
[87] PCT Pub. No.: WO82/03312
  PCT Pub. Date: Oct. 14, 1982

[30] Foreign Application Priority Data

Apr. 7, 1981 [NL] Netherlands .......................... 8101698

[51] Int. Cl.³ .............................................. A01K 29/00
[52] U.S. Cl. ................................................... 119/146
[58] Field of Search ................... 119/29, 96, 126, 145, 119/146

[56] References Cited

U.S. PATENT DOCUMENTS

| 539,428 | 5/1895 | Henley et al. | 119/145 |
| 3,036,554 | 5/1962 | Johnson | 119/96 |
| 3,062,183 | 11/1962 | Tate | 119/29 X |
| 4,062,323 | 12/1977 | Miyazawa | 119/146 |

FOREIGN PATENT DOCUMENTS

| 228579 | 11/1910 | Fed. Rep. of Germany . |
| 2034045 | 7/1970 | Fed. Rep. of Germany . |
| 7240082 | 11/1972 | France . |
| 6507772 | 12/1966 | Netherlands . |
| 126845 | 6/1969 | Netherlands . |
| 125773 | 8/1972 | Netherlands . |
| 7614315 | 12/1976 | Netherlands . |

*Primary Examiner*—Robert P. Swiatek
*Attorney, Agent, or Firm*—Fleit, Jacobson, Cohn & Price

[57] ABSTRACT

This disc has been invented in order to protect the udder and in particular the nipples of a cow against injuries inflicted by her hind legs and hooves. The disc is made of a flexible material. It has a hole in the center which makes it possible to attach it to the hind leg of a cow near the hoof. Its special feature consists of the fact that the disc decreases in thickness from the central hole towards the outer rim, thus giving it a wedge-like shape. The flexibility of the material and the thickness of the disc are chosen in such a way that the disc, because of its flexibility, will bend as soon as it comes into contact with the ground. As soon as the hind legs move, the disc will smoothly slide under the udder or nipples of the cow.

Another special feature is the fact that the disc can be delivered in one piece or with one cut in radial direction. The cut ends overlap each other. Close to the edge of the cut ends a series of holes has been punched. These holes can be connected in various combinations by means of bolts in such a way that the radius of the central opening can be increased or decreased. This way the disc may be used on any given cow.

4 Claims, 6 Drawing Figures

DISC FOR THE PROTECTION OF THE UDDER OF A COW

BACKGROUND OF THE INVENTION

This invention consists of an annular disc, developed to prevent injuries on the udder and especially the nipples of a cow. The injuries are caused by the hind leg of the cow. The disc is made of a flexible material with a central hole. It can be fitted and attached to the cow ankle close to the hoof. A similar disc has already been developed under the American patent specification nr. 4,062,323. The disc prevents injuries which occur when a cow gets up from her lying position. While standing up, the cow first moves her hind legs backwards and then pushes herself up. However, while moving her hind legs backwards and pushing herself off the ground, the udder, which is still lying on the ground, or even worse—the nipples, are often injured by the hooves of her hind legs. The protective function of the disc is based on the principle that, while the cow's hind legs move backwards, the disc, which is attached close to the hoof, will move the udder or nipples away before they can be stamped on by the hooves.

The protection disc known in America does not protect the udder sufficiently, because it is too thick and rigid. This results in the fact that the udder is only partly pushed away. The other part of the udder remains under the disc. Also, the disc can move across the upper part of the nipples or udder, causing them to get pinched between the ground and the hoof.

A further disadvantage of the known disc is that it is made of foamed material which owing to its proximity to the ground will tend to absorb moisture like leaking milk and dung. As a consequence, microbes may easily develop and possibly penetrate the nipples causing inflammations. This will affect the milk production and detract from the quality of the milk. Inflammations of the claws may tend to develop causing the cow difficulties with standing and moving which will also effect the milk production.

SUMMARY OF THE INVENTION

The purpose of this invention is to invent a disc which does not have the disadvantages mentioned above but in contrast has some additional advantages.

The new disc, according to the invention and seen in a perspective view has a thickness which decreases from the central hole towards the outer rim thus giving it a wedge like shape. The flexibility of the material and the thickness of the disc are chosen in such a way that the disc is sufficiently flexible to bend as soon as it touches the ground.

As soon as the hind legs move, the disc smoothly slides under the udder or nipples. When a cow, fitted with this new kind of disc, moves her hind legs backwards, the bent part of the flexible disc will move along the ground and slide under the udder. It will lift it off the ground and out of the reach of the hooves. Another advantage of the flexible disc is the fact that it will adjust itself to the body and hind legs of the cow when she has lain down. This way, the flexible disc with its central hole and soft outer rim does not apply any pressure against the udder of the cow.

Further, the disc according to the invention being made of closed smooth resilient material does not absorb moisture or accumulate dirt and other contaminates.

The disc can be delivered in two ways: either as an undivided disc or divided in one or two places. The undivided disc can be equipped with radial incisions running from the central hole towards the outer rim. This makes it easy to adjust the disc on the hind legs of the cow. In case the disc is cut, it is possible to have the cut ends overlap each other. They can be equipped with holes for bolts, pins or other items in order to adjust its size according to the width of the hind leg it has to be fitted to.

It will be understood that this represents another distinct advantage over the disc according to the above cited reference, which disc is provided with inner stripable cut pieces concentrically formed on the peripheral edge of the central hole separated from one another by dot-like connecting parts. Thus the central opening can only be widened with the disadvantage that the protective action becomes somewhat less.

BRIEF DESCRIPTION OF THE DRAWING

The invention will be further explained on the basis of the following drawings.

The diagrams consist of.

DETAILED DESCRIPTION OF THE DRAWING

Figure 1:
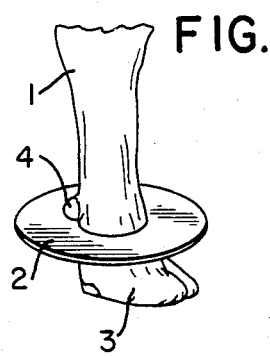
FIG. 1 schematic perspective view of a disc attached to the hind leg of a cow according to the invention.
Figure 2:
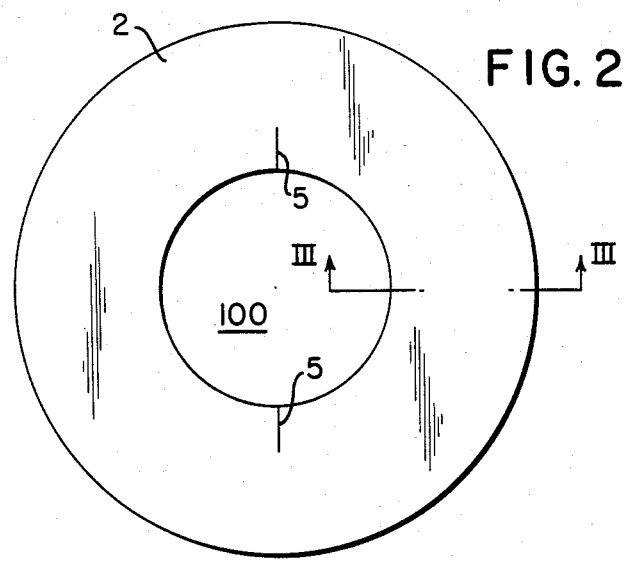
FIG. 2 the same disc enlarged—front view.
Figure 3:
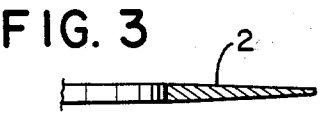
FIG. 3 sectional view taken along line III—III of FIG. 2.
Figure 4:
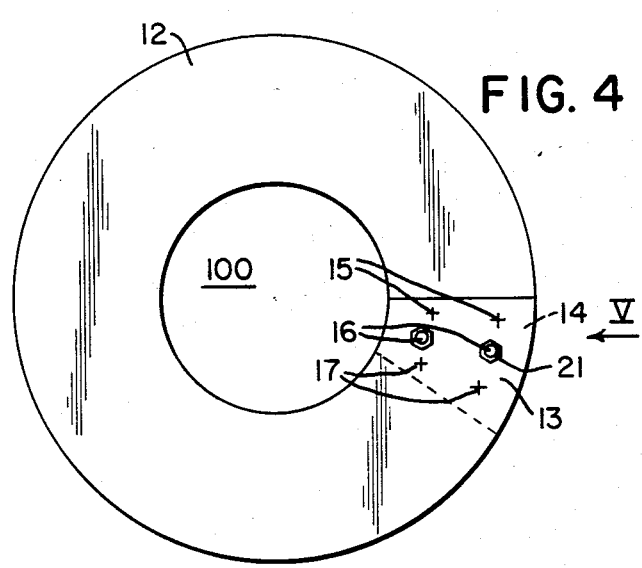
FIG. 4 front view illustrating a variation of the protective disc according to the present invention.
Figure 5:
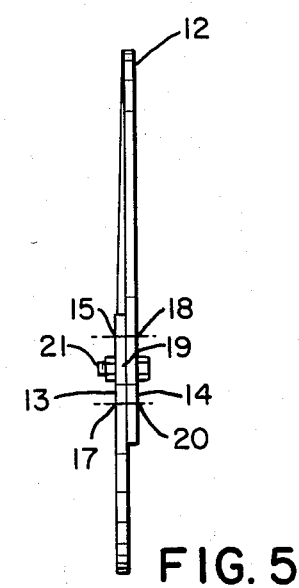
FIG. 5 front view along arrow V of FIG. 4.
Figure 6:
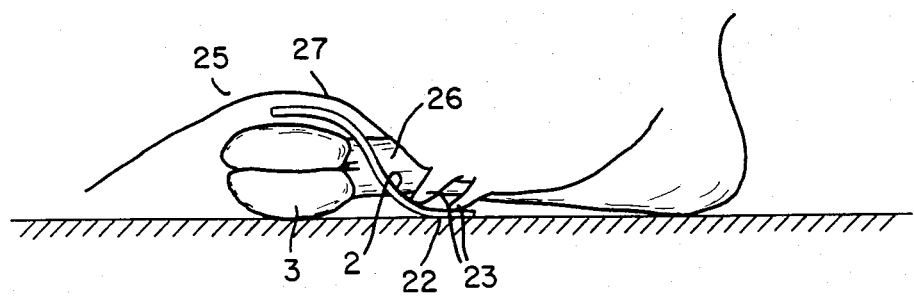
FIG. 6 schematic side view illustrating the back of a cow with a disc attached to her hind leg according to the invention and showing the disc in action.

FIG. 1 indicates the protective disc 2 being attached to the hind leg 1 of a cow between hoof and calcar 4. Here, an undivided disc has been used. FIG. 2 illustrates in front view the protective disc with the central hole 100 and the number "5" indicating two radial incisions. FIG. 3 illustrates a sectional view of disc 2, clearly indicating the decreasing thickness of the disc. At the outer rim, the disc can have a thickness of about 3 to 5 mm. In order to guarantee maximum efficiency, a disc with an outer radius of about three times as much as the radius of the central hole can be chosen. FIGS. 4 and 5 illustrate a divided disc 12. The cut ends are overlapping 13,14. If necessary, these parts can be thinner than the rest of the disc. A number of holes 15,16,17,18,19,20 has been punched into the material close to the radial cut. These holes can be connected with nuts and bolts 21. Depending on the hind leg of a paratícular cow, different sets of holes can be connected in order to increase or decrease the central opening 100. From FIG. 5 it appears that the disc may be of a substantially uniform thickness in case the thickness of the material is chosen relatively low in connection with the flexibility properties of the specific material, whereby wedge formation is not needed and not possible. FIG. 6 shows the back of a cow who has lain down. The hind legs are fitted with a protection disc 2. When the cow stands up, the bent part of the disc 22 will move along the ground and slide under the udder 23. It will lift the udder of the ground and out of the reach of the hooves 3 of the cow.

In addition, FIG. 6 shows how the upper half of the disc 2 adjusts itself to the cow's body without pressing against the ankle 26 of the hindleg.

The invention is in no way restricted to the models shown and described in the diagrams above. The disc can also be delivered consisting of two identical halves. This model can be manufactured by means of spray moulding. Furthermore, groove holes can be used for adjustment purposes instead of holes. The nuts and bolts can also be replaced by press-fastenings and other materials.

I claim:

1. A disc protecting the udder and the nipples of a cow against injuries inflicted by her hind legs and hooves, said disc comprising:

a flexible material in a wedge-like, circular configuration decreasing in thickness from a central region towards a soft outer rim with smooth upper and lower surfaces, said material being of wedge-like configuration to slide under the udder of the cow upon contact with the udder, said material being of sufficient thickness to bend upon contact with the udder; and said flexible material defining a hole at its center to surround the hind leg of the cow and to be attached to the cow near a hoof of the hind leg of the cow, said surface of said material is uninterrupted except for at least one incision running from said center hole towards said outer rim and terminating before said outer rim to position the disc on the hind leg of the cow.

2. The disc as described in claim 1, wherein a ratio of an outside radius of said material to a radius of said center hole is at least 3:1 to provide maximum protection for the udder.

3. A disc protecting the udder and the nipples of a cow against injuries inflicted by her hind legs and hooves, said disc comprising:

a flexible material in a wedge-like, circular configuration decreasing in thickness from a central region towards a soft outer rim with smooth upper and lower surfaces, said material being of wedge-like configuration to slide under the udder of the cow upon contact with the udder, said material being of sufficient thickness to bend upon contact with the udder; and said flexible material defining a hole at its center to surround the hind leg of the cow and to be attached to the cow near a hoof of the hind leg of the cow, said material contains at least one cut, in a radial direction extending from said center hole until said outer rim, producing two open cut edges overlapping each other and secured to each other by securing means extending through two of a plurality of holes along said cut edges whereby said plurality of holes are secured by said securing means to alter the radius of said center hole according to the width of the hind leg of the cow.

4. The disc as described in claim 3, wherein a ratio of an outside radius of said material to a radius of said center hole is at least 3:1 to provide maximum protection for the udder.

* * * * *